(12) United States Patent
Lee et al.

(10) Patent No.: US 9,818,327 B2
(45) Date of Patent: *Nov. 14, 2017

(54) DISPLAY DEVICE

(71) Applicant: Samsung Display Co., Ltd., Yongin (KR)

(72) Inventors: Sooyeon Lee, Seoul (KR); Joon-Chul Goh, Hwaseong-si (KR); Jung-Taek Kim, Seoul (KR); Aram Song, Hwaseong-si (KR); KyoungHo Lim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 165 days.

This patent is subject to a terminal disclaimer.

(21) Appl. No.: 14/739,991

(22) Filed: Jun. 15, 2015

(65) Prior Publication Data

US 2016/0117965 A1 Apr. 28, 2016

(30) Foreign Application Priority Data

Oct. 27, 2014 (KR) ........................ 10-2014-0146273

(51) Int. Cl.
*G06F 3/038* (2013.01)
*G09G 3/20* (2006.01)
(Continued)

(52) U.S. Cl.
CPC ........... *G09G 3/20* (2013.01); *G02F 1/13454* (2013.01); *G02F 1/136286* (2013.01);
(Continued)

(58) Field of Classification Search
CPC .. G09G 3/20; G09G 3/2085; G09G 2300/026; G09G 2300/0408;
(Continued)

(56) References Cited

U.S. PATENT DOCUMENTS 6,496,238 B1 12/2002 Greene et al.
7,479,642 B2 1/2009 Maack
(Continued)

FOREIGN PATENT DOCUMENTS

CN 104090439 10/2014
EP 2963637 1/2016
(Continued)

OTHER PUBLICATIONS

The Extended European Search Report issued on Mar. 15, 2016, in European Patent Application No. 15190543.7.

*Primary Examiner* — Nelson Rosario
(74) *Attorney, Agent, or Firm* — H.C. Park & Associates, PLC

(57) ABSTRACT

A display device includes a display panel including sub-pixels, a first driver adjacent to a first side of the display panel to generate first signals, and a second driver adjacent to the first side to generate second signals. The display panel includes vertical lines including one ends disposed at the first side to apply the first signals to the sub-pixels, diagonal lines crossing the vertical lines to apply the second signals to the sub-pixels, and crossing lines crossing the vertical and diagonal lines. The diagonal lines include first diagonal lines including one ends at the first side and second diagonal lines including one ends at a second side adjacent to the first side. The crossing lines include one ends at the first side and the other ends at the second side. The crossing lines receive the second signals and apply the second signals to the second diagonal lines.

18 Claims, 11 Drawing Sheets

(51) Int. Cl.
*G02F 1/1362* (2006.01)
*G02F 1/1345* (2006.01)

(52) U.S. Cl.
CPC .............. *G02F 2001/13456* (2013.01); *G09G 2300/0408* (2013.01); *G09G 2300/0426* (2013.01); *G09G 2300/0452* (2013.01); *G09G 2300/0823* (2013.01); *G09G 2310/027* (2013.01); *G09G 2310/0254* (2013.01); *G09G 2310/0267* (2013.01); *G09G 2310/0281* (2013.01); *G09G 2320/0223* (2013.01); *G09G 2320/0233* (2013.01)

(58) Field of Classification Search
CPC ... G09G 2300/0413; G09G 2300/0426; G09G 2300/043; G09G 2310/0202; G09G 2310/0278; G09G 2310/0281; G09G 2310/08; G09G 2320/0247
See application file for complete search history.

(56) References Cited

U.S. PATENT DOCUMENTS

| | | | |
|---|---|---|---|
| 2006/0070274 A1* | 4/2006 | Maack | G02F 1/134336 40/447 |
| 2014/0043306 A1* | 2/2014 | Min | G09G 3/3685 345/204 |
| 2015/0262554 A1 | 9/2015 | Park et al. | |
| 2015/0340001 A1 | 11/2015 | Jung et al. | |
| 2016/0005351 A1* | 1/2016 | Jeon | G09G 3/20 345/204 |

FOREIGN PATENT DOCUMENTS

| | | |
|---|---|---|
| KR | 10-2005-0015163 | 2/2005 |
| KR | 10-2011-0042674 | 4/2011 |
| KR | 10-2015-0107943 | 9/2015 |
| KR | 10-2015-0133934 | 12/2015 |
| WO | 2004/063803 | 7/2004 |

* cited by examiner

DISPLAY DEVICE

CROSS-REFERENCE TO RELATED APPLICATION

This application claims priority from and the benefit of Korean Patent Application No. 10-2014-0146273, filed on Oct. 27, 2014, which is hereby incorporated by reference for all purposes as if fully set forth herein.

BACKGROUND

Field

Exemplary embodiments relate to a display device. More particularly, exemplary embodiments relate to a display device including a display panel having a new structure capable of realizing a narrow bezel.

Discussion of the Background

In recent years, as the market demand for narrow bezel-type display panels continues to increase, research for reducing a non-display area (bezel) of a display panel has been actively performed. However, there is a limitation to reduce the non-display area of the display panel since a gate driver is disposed in the non-display area of the display panel.

Accordingly, instead of disposing gate and data drivers in one side of the display panel, a structure allowing the non-display area to be removed from the display panel by effectively arranging lines in the display panel has been researched.

Recently, a structure, in which data lines connected to the data driver disposed at one side of the display panel extend in a vertical direction and gate lines connected to the gate driver disposed at the same side as the data driver extend in a diagonal direction, has been developed.

In this case, however, since the gate lines are disposed in a diagonal direction, there may be some gate lines which are difficult to be connected directly to the gate driver at the same side as the data driver. Therefore, additional gate lines extending in the vertical direction should be added to the display panel to connect all the gate lines to the gate driver completely. Consequently, a length of the gate lines extending in the diagonal from the gate driver to pixels comes to be greatly increased by the additional gate lines in a vertical direction. As a result, a load of the gate lines increases and this brings a difference in brightness.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device having gate and data drivers disposed together at one side of a display panel.

Exemplary embodiments provide a display device capable of reducing a brightness difference that the sharply increased length of the gate line may cause.

Exemplary embodiments provide a display device including sub-pixels operating in an inversion driving scheme.

Additional aspects will be set forth in the following detailed description, and, in part, will be apparent from the disclosure, or may be learned by practice of the inventive concept.

According to exemplary embodiments, a display device comprises a display panel configured to include a plurality of sub-pixels, a first driver disposed adjacent to a first side of the display panel to generate first signals, and a second driver disposed adjacent to the first side to generate second signals. The display panel includes vertical lines including one ends disposed at the first side to apply the first signals from the first driver to the sub-pixels, diagonal lines crossing the vertical lines to apply the second signals to the sub-pixels, and crossing lines crossing the vertical lines and the diagonal lines. The diagonal lines include first diagonal lines in which one ends thereof are disposed at the first side and second diagonal lines in which one ends thereof are disposed at a second side adjacent to the first side. The crossing lines include one ends disposed at the first side and the other ends disposed at the second side. The crossing lines receive the second signals from the second driver and apply the second signals to the second diagonal lines.

The vertical lines extend in a first direction and are arranged in a second direction, the diagonal lines extend in a third direction, the crossing lines extend in a fourth direction, and the first direction, the second direction, the third direction, and the fourth directions are different from each other.

The first direction is substantially vertical to the first side and the second direction is substantially parallel to the first side.

The sub-pixels are arranged in the first direction and the second directions on the display panel.

The sub-pixels are grouped into a plurality of sub-pixel columns by the unit of the sub-pixels arranged in the first direction and the sub-pixel columns are alternately arranged with the vertical lines on the display panel.

The diagonal lines and the crossing lines have a step-like shape.

The diagonal lines and the crossing lines are bent every predetermined number of the sub-pixels to have the step-like shape.

Each of the sub-pixels is connected to a corresponding vertical line of the vertical lines and a corresponding diagonal line of the diagonal lines.

The vertical lines, the diagonal lines, and the crossing lines intersect when viewing from top but are insulated from each other. The vertical lines, the diagonal lines, and the crossing lines are disposed on different layers from each other and insulated from each other.

The display panel further includes contact portions to connect the second diagonal lines to the crossing lines.

The sub-pixels are grouped into a plurality of pixel groups and each of the pixel groups is configured to include the sub-pixels receiving signals having a same polarity.

The sub-pixels are inversely driven by each of the pixel groups.

The first signals are data signals, the first driver is a data driver, the second signals are gate signals, and the second driver is a gate driver.

The sub-pixels included in the pixel groups adjacent to each other among the pixel groups receive the first signals having different polarities.

Among the sub-pixels, each of sub-pixels included in a first pixel group among the pixel groups receive the first signals with a positive polarity and each of sub-pixels included in a second pixel group next to the first pixel group receive the first signals with a negative polarity.

The sub-pixels operate sequentially in the unit of the sub-pixels connected to a same diagonal line in response to the second signals.

The first signals are gate signals, the first driver is a gate driver, the second signals are data signals, and the second driver is a data driver.

The sub-pixels operate sequentially by each of the sub-pixels connected to a same vertical line in response to the first signals.

According to the above, the data driver and the gate driver are disposed together at one side of the display panel, and thus a non-display area, e.g., a bezel, of the display device may be reduced.

In addition, since the display device includes gate lines extending in a diagonal direction, the present invention may not increase the length of the gate lines greatly and may prevent the brightness difference that may be caused by the longer lines.

Further, since the sub-pixels are inversely driven, a coupling or interference between the sub-pixels may be prevented from occurring.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
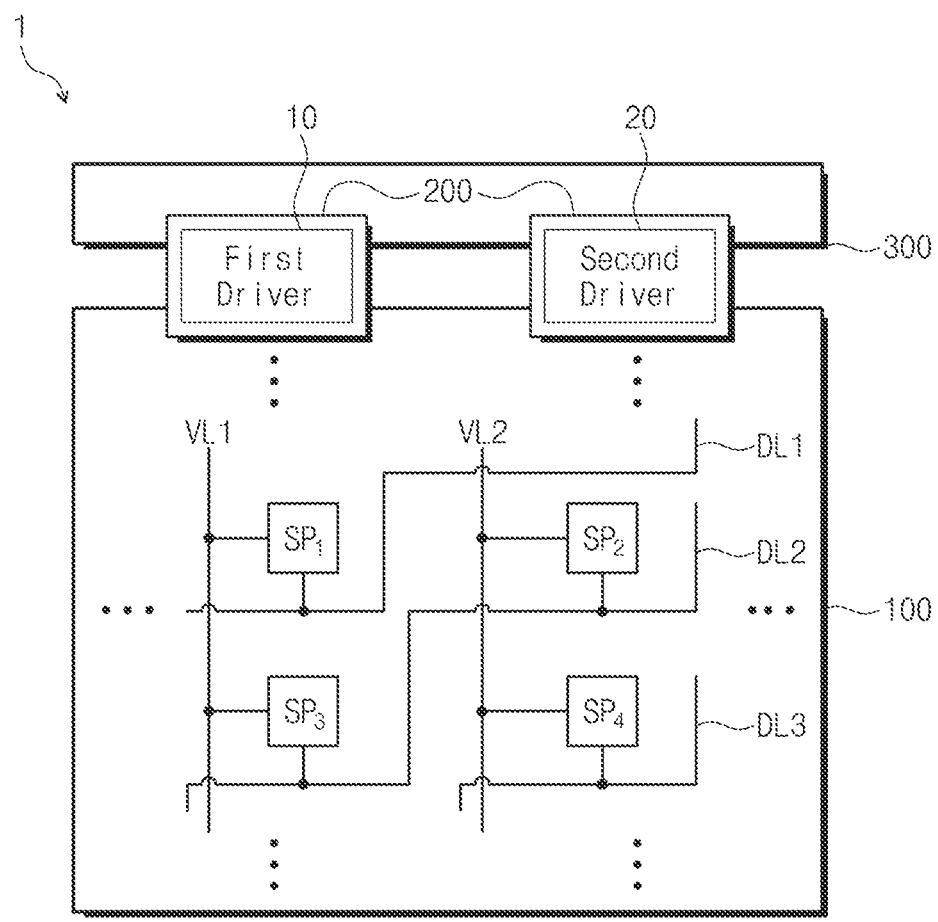
FIG. 1 is a block diagram showing a display device according to an exemplary embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on", "connected to" or "coupled to" another element or layer, it can be directly on, connected to, or coupled to the other element or layer or intervening elements or layers may be present. When, however, an element or layer is referred to as being "directly on," "directly connected to" or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers and/or sections, these elements, components, regions, layers and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath", "below", "lower", "above", "upper" and the like, may be used herein for descriptive purposes, and thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Further more, the apparatus may be otherwise oriented (e.g., rotated 90 degrees or at other orientations) and, as such, the spatially relative descriptors used herein interpreted accordingly.

The terminology used herein is for the purpose of describing particular embodiments and is not intended to be limiting. As used herein, the singular forms, "a", "an" and "the" are intended to include the plural forms as well, unless the context clearly indicates otherwise. Moreover, the terms "comprises," "comprising," "includes" and/or "including", when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a block diagram showing a display device 1 according to an exemplary embodiment of the present disclosure.

Referring to FIG. 1, the display device 1 includes a display panel 100, a flexible printed circuit board 200, a printed circuit board 300, a first driver 10, a second driver 20, and a controller (not shown).

The display panel 100 may be a variety of display panels, such as an organic light emitting display panel, a liquid crystal display panel, a plasma display panel, an electrophoretic display panel, an electrowetting display panel, etc.

The display panel 100 displays an image. To this end, the display panel 100 includes transmission lines VL1, VL2 and DL1 to DL3 to transmit gate and data signals and a plurality of sub-pixels SP1 to SP4 connected to the transmission lines VL1, VL2 and DL1 to DL3. The transmission lines VL1, VL2 and DL1 to DL3 are configured to include vertical lines VL1 VL2, diagonal lines DL1 to DL3, and crossing lines (not shown).

One ends of the vertical lines VL1 and VL2 are disposed at a first side 30 (FIG. 2) of the display panel 100 to apply the gate signals or the data signals to the sub-pixels SP1 to SP4. The diagonal lines DL1 to DL3 and the crossing lines cross the vertical lines VL1 and VL2 to apply the data signals or the gate signals to the sub-pixels SP1 to SP4. Detailed descriptions of the lines will be described in detail with reference to FIG. 2.

The display panel 100 includes thin film transistors (not shown)—connected to a corresponding vertical line of—VL1 and VL2 and a corresponding diagonal line of DL1 to DL3 and sub-pixels connected to the thin film transistors.

Each thin film transistor includes a gate electrode, a source electrode, and a drain electrode. The gate electrode is connected to the corresponding vertical line or the corresponding diagonal line to receive a corresponding gate signal. The source electrode is connected to the corresponding diagonal line or the corresponding vertical line to receive a corresponding data signal. The drain electrode is connected to a corresponding sub-pixel. Accordingly, each thin film transistors applies the corresponding data signal to the corresponding sub-pixel in response to the corresponding gate signal applied thereto. Detailed descriptions on the structure of the thin film transistor will be described in detail with reference to FIGS. 6A to 6C and 7A to 7C.

The printed circuit board 300 is disposed adjacent to the first side 30 (FIG. 2) of the display panel 100. The printed circuit board 300 includes a controller (not shown), a first driver 10, and a second driver 20 to drive the display panel 100. In the exemplary embodiment, the first and second drivers 10 and 20 may respectively serve as data and gate drivers or as gate and data drivers.

The controller receives control signals from an external graphic controller (not shown). The controller generates various control signals to control the first and second drivers 10 and 20 in response to the control signals, e.g., a vertical synchronization signal, a horizontal synchronization signal, a main clock, a data enable signal, etc.

The first and second drivers 10 and 20 generate first and second signals in response to the control signals from the controller, respectively. For instance, when assuming that the first driver 10 is the data driver and the second driver 20 is the gate driver, the first driver 10 generates the first signal as the data signal and the second driver 20 generates the second signal as the gate signal. As another example, when assuming that the first driver 10 is the gate driver and the second driver 20 is the data driver, the first driver 10 generates the first signal as the gate signal and the second driver 20 generates the second signal as the data signal.

The flexible printed circuit board 200 electrically connects the display panel 100 to the printed circuit board 300. One end of the flexible printed circuit board 200 is connected to the display panel 100 and the other end of the flexible printed circuit board 200 is connected to the printed circuit board 300, and thus the printed circuit board 300 is electrically connected to the display panel 100.

The flexible printed circuit board 200 may be bent to a rear side of the display panel 100 and the printed circuit board 300 may be disposed on a rear surface of the display panel 100 accordingly.

In FIG. 1, the first and second drivers 10 and 20 are disposed on the flexible printed circuit board 200, but they should not be limited thereto or thereby. That is, the first and second drivers 10 and 20 may be disposed on the display panel 100 or the printed circuit board 300.

Figure 2:
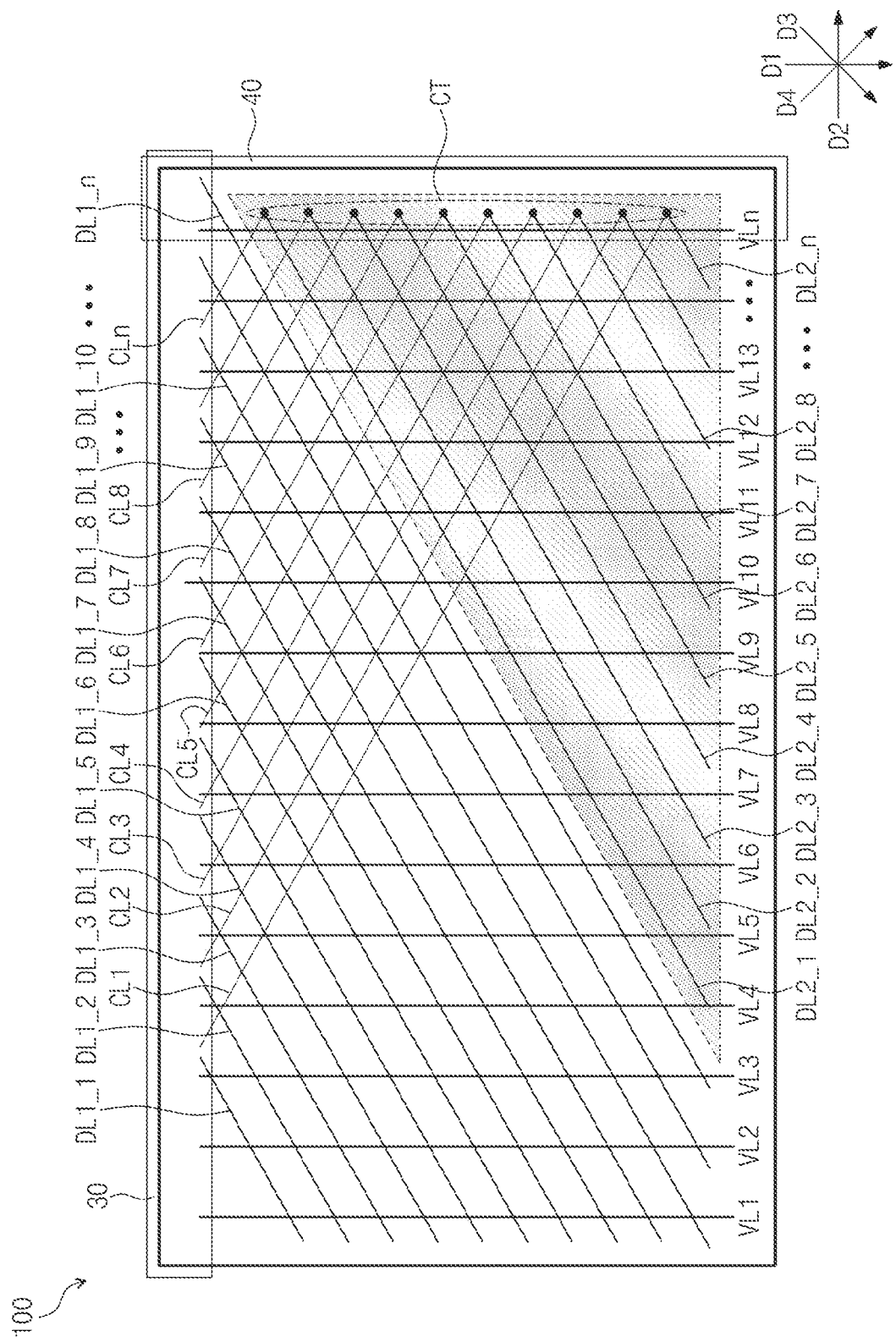
FIG. 2 is a plan view showing a display panel including vertical lines, diagonal lines, and crossing lines according to an exemplary embodiment of the present disclosure.

FIG. 2 is a plan view showing the display panel including vertical lines VL1 to VLn, diagonal lines DL1_1 to DL1_n, DL2_1 to DL2_n and crossing lines CL1 to CLn according to an exemplary embodiment of the present disclosure.

Referring to FIG. 2, the display panel 100 includes the vertical lines VL1 to VLn, the diagonal lines DL1_1 to DL1_n and DL2_1 to DL2_n, and the crossing lines CL1 to CLn, which transmit the first and second signals from the first and second drivers 10 and 20 disposed adjacent to the first side 30 of the display panel 100. The first side 30 of the display panel 100 indicates one side of the display panel 100, which is neighboring to the first and second drivers 10 and 20.

Each of the vertical lines VL1 to VLn extends in a first direction D1 on the display panel 100 and the vertical lines are arranged in a second direction D2. The first direction D1 is a direction substantially vertical to the first side 30 and the second direction D2 is a direction substantially parallel to the first side 30. One ends of the vertical lines VL1 to VLn are disposed at the first side 30 of the display panel 100. Thus, the vertical lines VL1 to VLn receive the first signals from the first driver 10 disposed adjacent to the first side 30 to apply the first signals to the sub-pixels.

Each of the diagonal lines DL1_1 to DL1_n and DL2_1 to DL2_n extends in a third direction D3 on the display panel 100 and the diagonal lines are arranged in a fourth direction D4. The third and fourth directions D3 and D4 are different from the first and second directions D1 and D2 and cross the first and second directions D1 and D2, respectively.

That is, the first to fourth directions D1 to D4 are different from each other as disclosed in FIG. 2.

The diagonal lines are configured to include first diagonal lines DL1_1 to DL1_n, of which one ends thereof are disposed at the first side 30, and second diagonal lines DL2_1 to DL2_n, of which one ends thereof are disposed at a second side 40 adjacent to the first side 30.

Since the one ends of the first diagonal lines DL1_1 to DL1_n are disposed at the first side 30 adjacent to the second driver 20, the first diagonal lines DL1_1 to DL1_n directly receive the second signals from the second driver 20 to apply the second signals to the sub-pixels connected thereto. On the contrary, since the one ends of the second diagonal lines DL2_1 to DL2_n are not disposed at the first side 30, the second diagonal lines DL2_1 to DL2_n do not directly receive the signals from the second driver 20. According to the conventional art, additional vertical lines connected to the second driver 20 (not shown) are required to transmit the second signals to the sub-pixels from the second driver 20.

In this case, an arrangement structure of the additional vertical lines may bring a problem. For instance, when a white grayscale is displayed on the entire area of the display panel 100, a dark area having a relatively low brightness may be perceived at a boundary portion between the first diagonal line DL1_n and the second diagonal line DL2_1 which should be connected to the second driver 20 through the additional vertical line.

This is because a total length of the line connecting the second driver 20 to the sub-pixels connected to the second diagonal line DL2_1 is greatly increased due to the additional vertical line when compared to that of the first diagonal line DL1_n adjacent to the second diagonal line DL_1.

According to the embodiment disclosed in FIG. 2, the display device 1 may further include the crossing lines CL1 to CLn disposed at the first side 30. The crossing lines CL1 to CLn directly receive the second signals from the second driver 20 disposed adjacent to the first side 30 and apply the second signals to the second diagonal lines DL2_1 to DL2_n.

To prevent the dark area from being perceived, the length of the crossing lines CL1 to CLn is required to be minimized. Accordingly, the crossing lines CL1 to CLn are arranged to cross the vertical lines VL1 to VLn and the diagonal lines DL1_1 to DL1_n and DL2_1 to DL2_n. In particular, when the diagonal lines DL1_1 to DL1_n and DL2_1 to DL2_n extend in the third direction D3 and are arranged in the fourth direction D4, the crossing lines CL1 to CLn extend in the fourth direction D4 and are arranged in the third direction D3.

The third and fourth directions D3 and D4 correspond to directions obtained by rotating the first direction D1 in a clockwise or counter-clockwise direction. For instance, the third direction D3 indicates the direction obtained by rotating the first direction D1 in the clockwise direction at about 45 degrees. The fourth direction D4 indicates the direction obtained by rotating the first direction D1 in the counter-clockwise direction at about 45 degrees. When the third and fourth directions D3 and D4 have the same angle with respect to the first direction D1, the total length of the second diagonal line DL2_1 and the crossing line CLn is substantially equal to the length of the first diagonal line DL1_n, and thus the dark area may be prevented because a resistance and a capacitance of the lines based on the length can be maintained stably without a sharp change.

In addition, one ends of the crossing lines CL1 to CLn are disposed at the first side 30 and the other ends of the crossing lines CL1 to CLn are disposed at the second side 40. When viewed in a plan view, the other ends of the crossing lines CL1 to CLn are overlapped with one ends of the second diagonal lines DL2_1 to DL2_n at the second side 40. In this case, the other ends of the crossing lines CL1 to CLn are connected to one ends of the second diagonal lines DL2_1 to DL2_n through a contact portion CT disposed in the second side 40. The contact portion CT includes at least one contact hole. The contact portion CT will be described in detail later with reference to FIGS. 6A to 6C and 7A to 7C.

As described above, since the crossing lines CL1 to CLn extend in the fourth direction D4 and are arranged in the third direction D3, the total length of one crossing line and one diagonal line connected to the one crossing line becomes substantially equal to the first diagonal line DL1_n neighboring to the one crossing line and the one diagonal line. As a result, the total length of the transmission lines used to transmit the second signals to the sub-pixels may not increase greatly.

The vertical lines VL1 to VLn, the diagonal lines DL1_1 to DL1_n and DL2_1 to DL2_n, and the crossing lines CL1 to CLn overlap each other when viewed in a plan view and are insulated from each other. In addition, the vertical lines VL1 to VLn, the diagonal lines DL1_1 to DL1_n and DL2_1 to DL2_n, and the crossing lines CL1 to CLn may be disposed not to overlap with the sub-pixels in a plan view. This is because overlapping the lines with the sub-pixels may reduce an aperture ratio of the sub-pixels. Therefore, the sub-pixels and the lines are arranged in consideration of the aperture ratio of the display panel 100.

Figure 3:
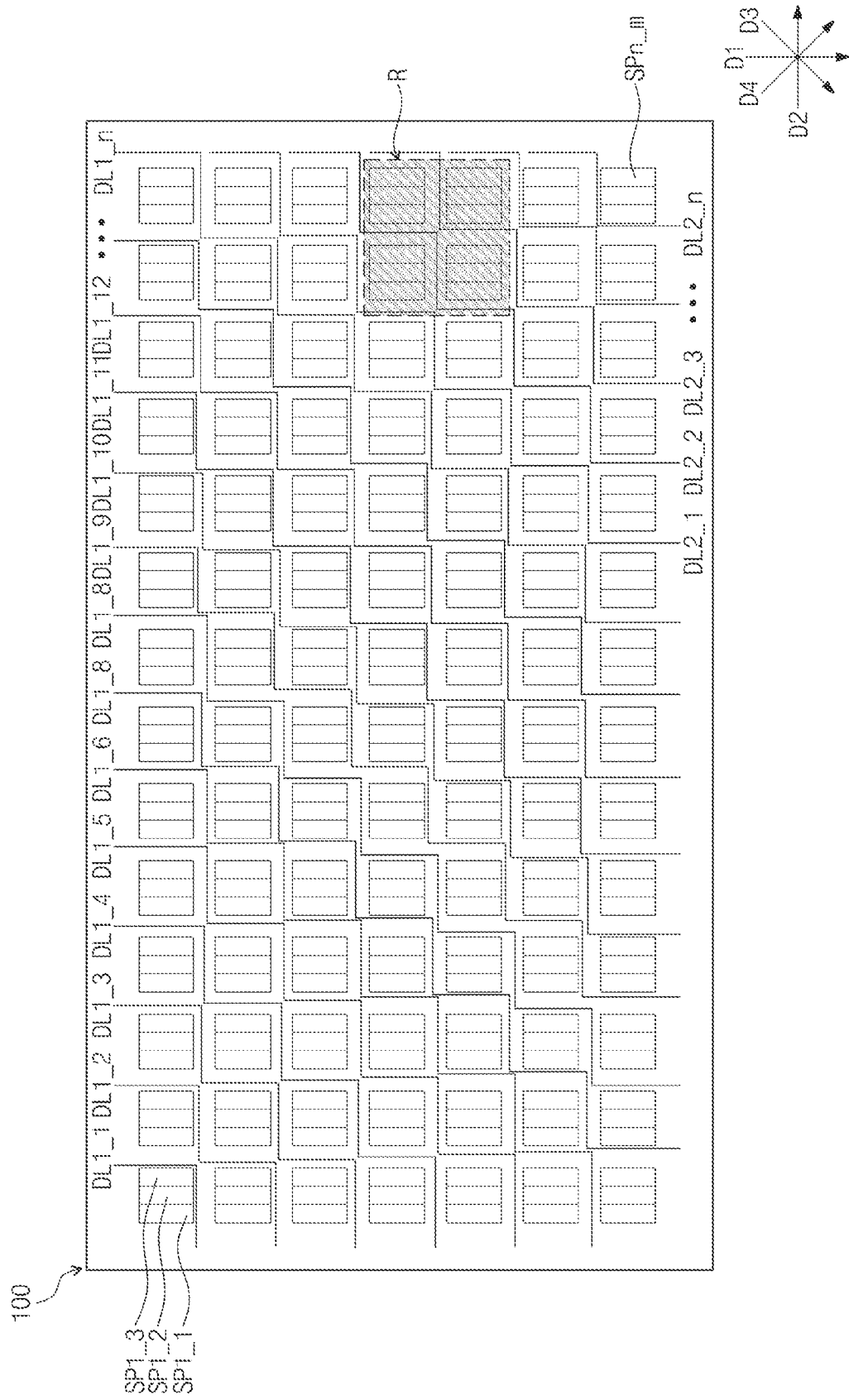
FIG. 3 is a plan view showing a display panel including a plurality of sub-pixels according to an exemplary embodiment of the present disclosure.

FIG. 3 is a plan view showing a display panel 100 including a plurality of sub-pixels according to an exemplary embodiment of the present disclosure.

Referring to FIG. 3, the display panel 100 includes the sub-pixels SP1_1 to SPn_m to display colors. The sub-pixels SP1_1 to SPn_m are arranged on the display panel 100 in various ways. For instance, the sub-pixels SP1_1 to SPn_m are arranged in the first and second directions D1 and D2 as shown in FIG. 3. According to embodiments, the sub-pixels SP1_1 to SPn_m may be arranged in the third and fourth directions D3 and D4. Hereinafter, for the convenience of explanation, the display panel 100 including the sub-pixels SP1_1 to SPn_m arranged in the first and second directions D1 and D2 will be described in detail.

When the sub-pixels SP1_1 to SPn_m are arranged in the first and second directions D1 and D2, the sub-pixels arranged in the first direction D1 are grouped to define a plurality of sub-pixel columns. The vertical lines VL1 to VLn having a straight line shape are alternately arranged with the sub-pixel columns on the display panel 100.

When the diagonal lines DL1_1 to DL1_n and DL2_1 and DL2_n having the straight line shape and the crossing lines CL1 to CLn having the straight line shape are disposed on the display panel 100, the diagonal lines and the crossing lines may be overlapped with the sub-pixels when viewed in a plan view. The aperture ratio of the display panel 100 may be reduced due to the overlap between the lines and the sub-pixels. Therefore, to improve the aperture ratio, the diagonal lines DL1_1 to DL1_n and DL2_1 and DL2_n and the crossing lines CL1 to CLn extend in a step-like shape rather than the straight line shape. As shown in FIG. 3, the diagonal lines DL1_1 to DL1_n and DL2_1 to DL2_n extend in the step-like shape along the third direction D3 such that the diagonal lines DL1_1 to DL1_n and DL2_1 to DL2_n do not overlap the sub-pixels SP1_1 to SPn_m when viewed in a plan view. Similarly, the crossing lines CL1 to CLn may be formed in the step-like shape and extend in the fourth direction D4 along a boundary of the sub-pixels SP1_1 to SP1n_m.

In this case, the diagonal lines DL1_1 to DL1_n and DL2_1 to DL2_n or the crossing lines CL1 to CLn are bent every predetermined number of sub-pixels to have the step-like shape. For instance, as shown in FIG. 3, each of the diagonal lines DL1_1 to DL1_n and DL2_1 to DL2_n has the step-like shape in which each of the diagonal lines DL1_1 to DL1_n and DL2_1 to DL2_n is bent every three sub-pixels. Similarly, each of the crossing lines CL1 to CLn is bent every three sub-pixels to have the step-like shape.

As the predetermined number of the sub-pixels decreases, a slope of the diagonal lines DL1_1 to DL1_n and DL2_1 to DL2_n and the crossing lines CL1 to CLn increases, and as the predetermined number of the sub-pixels increases, the slope of the diagonal lines DL1_1 to DL1_n and DL_1 to DL2_n and the crossing lines CL1 to CLn decreases. Thus, the predetermined number of the sub-pixels may be determined depending on a shape and a size of the display panel 100, a shape and a size of the sub-pixels, and an arrangement and a driving method of the sub-pixels.

Hereinafter, for the convenience of explanation, the diagonal lines DL1_1 to DL1_n and DL2_1 to DL2_n and the crossing lines CL1 to CLn, which are bent every three sub-pixels along the step-like shape, will be described in detail.

Figure 4A:
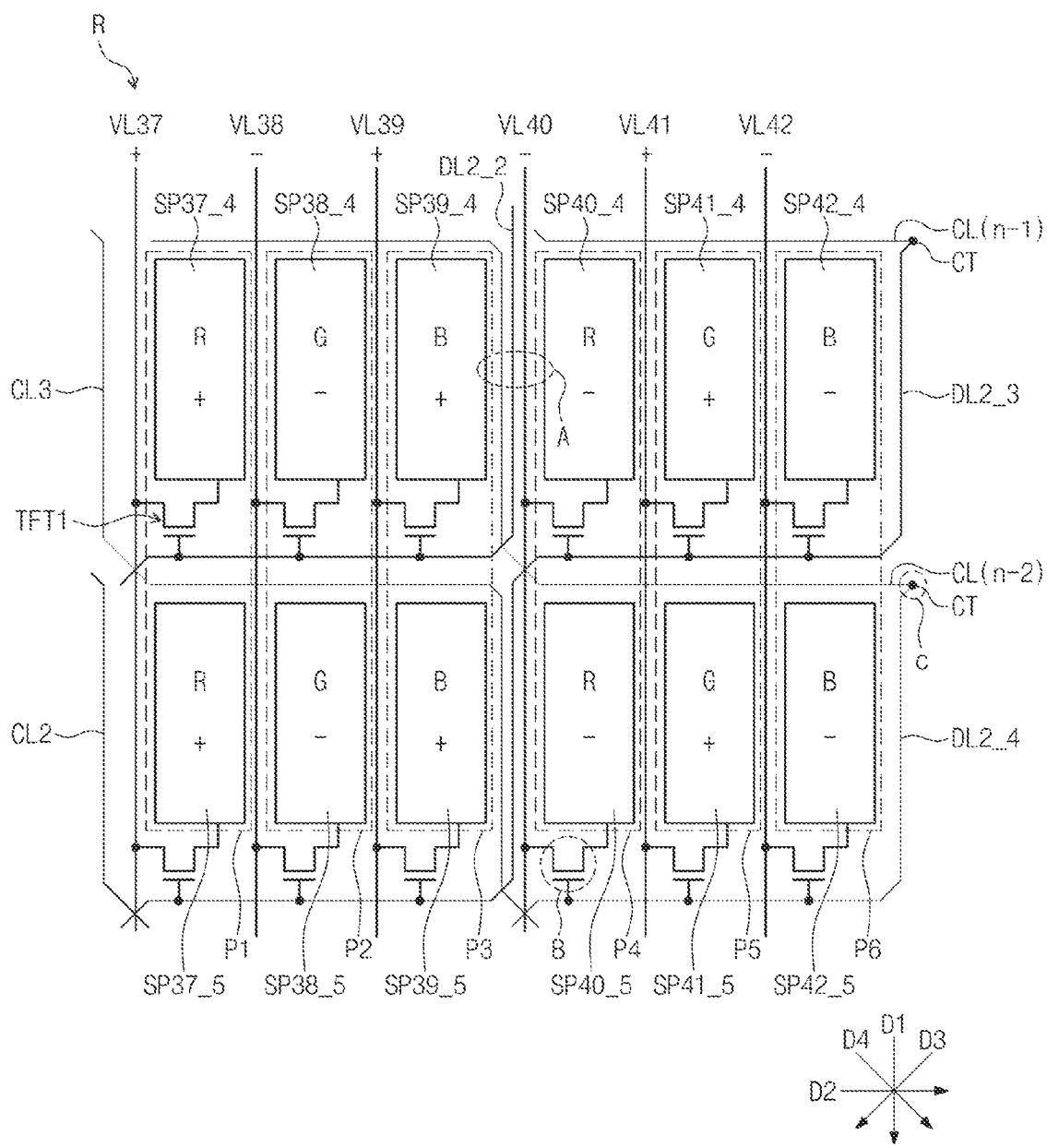
FIGS. 4A and 4B are enlarged views regarding a portion "R" of FIG. 3 according to an exemplary embodiment of the present disclosure.
Figure 4B:
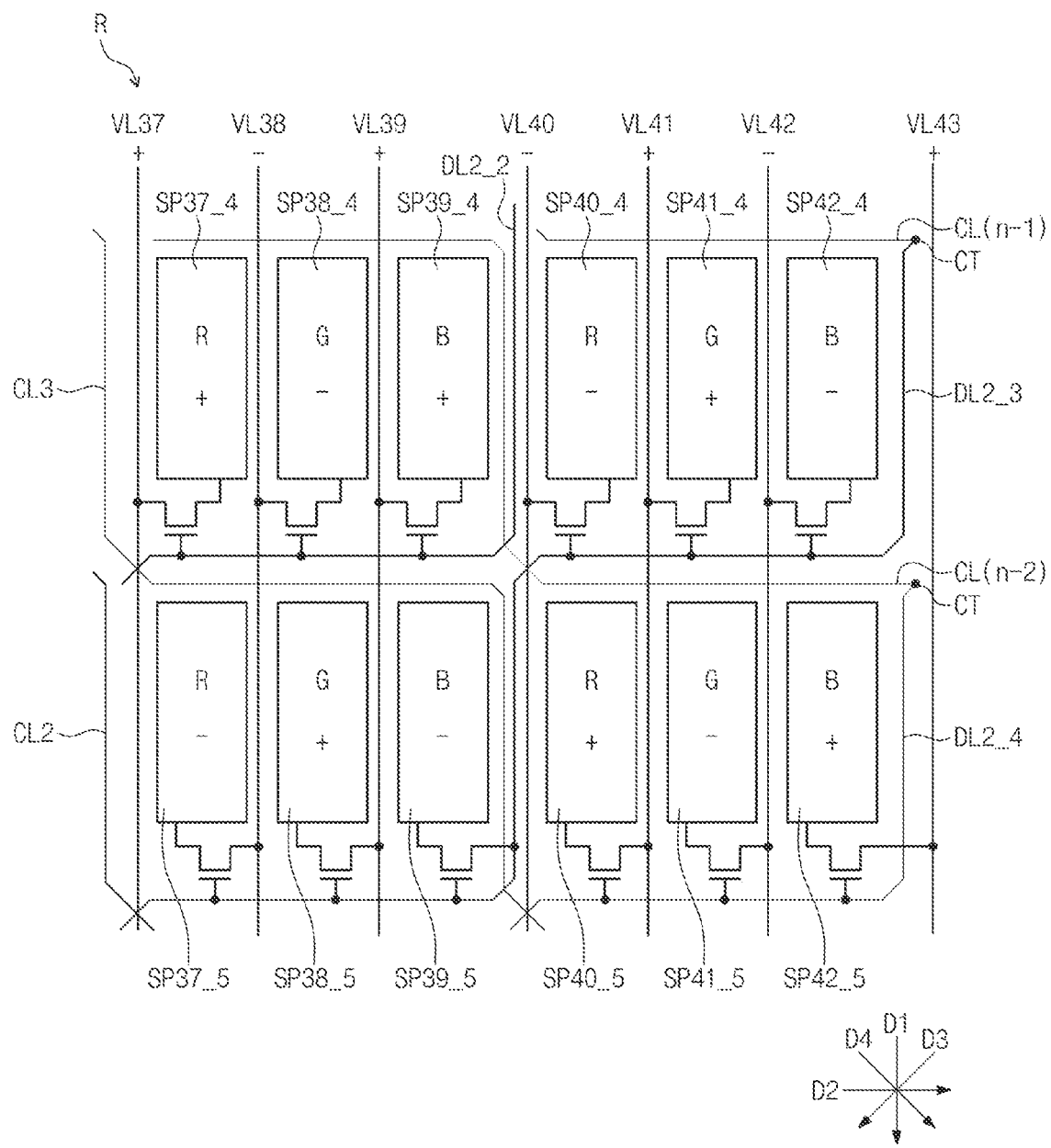

FIGS. 4A and 4B are enlarged views regarding a portion "R" of FIG. 3 according to an exemplary embodiment of the present disclosure. In the present exemplary embodiment, the first and second drivers 10 and 20 may be, but not limited to, the data and gate drivers, respectively, and thus the first and second signals may be, but not limited to, the data and gate signals, respectively.

Referring to FIGS. 4A and 4B, each of the sub-pixels SP37_4 to SP42_5 is connected to the corresponding vertical line and the corresponding diagonal line. In particular, each of the sub-pixels SP37_4 to SP42_5 is connected to the corresponding vertical line and the corresponding diagonal line through the corresponding thin film transistor. The gate electrode of the thin film transistor TFT1 is connected to the corresponding diagonal line DL2_2, the source electrode of the thin film transistor TFT1 is connected to the corresponding vertical line VL37, and the drain electrode of the thin film transistor TFT1 is connected to the corresponding sub-pixel SP37_4. Accordingly, the thin film transistor TFT1 receives the data signal in response to the gate signal and applies the data signal to the sub-pixel SP37_4 connected thereto.

Each of the vertical lines VL37 to VL42 is disposed adjacent to one side of the sub-pixel columns arranged in the first direction D1. The sub-pixels arranged in the same column are connected to one vertical line disposed adjacent to the one side thereof. As another way, the sub-pixels arranged in the same column may be alternately connected to two vertical lines disposed at both sides thereof.

Each of the diagonal lines DL2_2 to DL2_4 and each of the crossing lines CL2 to CL (n−1) are bent every three sub-pixels and extend in the step-like shape.

When three sub-pixels are referred to as one pixel in the structure in which the diagonal lines DL1_1 to DL1_n and DL2_1 to DL2_n and the crossing lines CL1 to CLn are bent every three sub-pixels, the vertical line VL40, the diagonal line DL2_2, and the crossing line CL_(n_2) are disposed in an area A between two pixels adjacent to each other without overlap.

For instance, the vertical line VL40, the diagonal line DL2_2, and the crossing line CL_(n−2) are arranged in order of the crossing line CL_(n−2), the diagonal line DL2_2, and the vertical line VL40 between the two pixels SP39_4 and SP40_4 as shown in FIG. 4A, but the arrangement of the transmission lines VL40, DL2_2, and CL_(n−2) should not be limited thereto or thereby.

For example, at least two lines of the transmission lines VL40, DL2_2, and CL_(n−2) may overlap with each other when viewed in a plan view according to a structure, a driving method, and a manufacturing method of the display panel 100.

Each of the sub-pixels SP37_4 to SP42_5 receives the second signal as the gate signal through the corresponding diagonal line of the diagonal lines DL2_2 to DL2_4, which is connected thereto. Therefore, the sub-pixels SP37_4 to SP42_5 are sequentially operated in the unit of the sub-pixels connected to the same diagonal line.

In addition, each of the sub-pixels SP37_4 to SP42_5 receives the first signal as the data signal through the corresponding vertical line of the vertical lines VL37 to VL42. In this case, the first signals applied to adjacent vertical lines among the vertical lines VL37 to VL42 have different polarities from each other. For instance, the first signal applied to the first vertical line VL37 has a positive (+) polarity and the first signal applied to the second vertical line VL38 adjacent to the first vertical line VL37 has a negative (−) polarity.

The sub-pixels SP37_4 to SP42_5 are grouped every predetermined number of sub-pixels to define a plurality of pixel groups. In more detail, the sub-pixels SP37_4 to SP42_5 are grouped as viewed relative to the polarity of the first signals applied to the sub-pixels SP37_4 to SP42_5 to define the pixel groups. Thus, the sub-pixels grouped into the same pixel group receive the first signals having the same polarity. On the contrary, the sub-pixels included in the pixel groups adjacent to each other receive the first signals having different polarities. The adjacent pixel groups indicate the pixel groups adjacent to each other in the first and second directions D1 and D2.

For instance, among the pixel groups, at least one first sub-pixel included in a first pixel group receives the first signal having the positive polarity and at least one second sub-pixel included in a second pixel group adjacent to the first pixel group receives the first signal having the negative polarity. As a result, the sub-pixels SP37_4 to SP42_5 are inversely driven in the unit of the pixel group.

Referring to FIG. 4A, the sub-pixels SP37_4 to SP42_5 are grouped into the pixel groups P1 to P6 in the unit of the sub-pixels arranged in the first direction D1. In this case, the sub-pixels included in one pixel group, i.e., the same pixel group, are connected to the same vertical line and receive the first signals having the same polarity. In addition, the sub-pixels included in the adjacent pixel groups are connected to different vertical lines from each other and receive the first signals having different polarities from each other.

For instance, the first sub-pixels SP37_4 and SP37_5 included in the first pixel group P1 receive the first signals having the positive polarity, and the second sub-pixels SP38_4 and SP38_5 included in the second pixel group P2 disposed at a right side of the first pixel group P1 receive the first signals having the negative polarity.

As a result, the sub-pixels SP37_4 to SP42_5 are inversely driven every pixel group along the second direction D2.

Referring to FIG. 4B, each of the sub-pixels SP37_4 to SP42_5 may be defined as one pixel group. In this case, the sub-pixels (or the pixel groups) adjacent to each other are connected to different vertical lines VL37 to VL42, respectively, and thus the sub-pixels adjacent to each other receive the first signals having different polarities.

For instance, the first sub-pixel SP37_4 receives the first signal with the positive polarity and the second sub-pixel SP37_5 disposed at a lower portion of the first sub-pixel SP37_4 receives the first signal with the negative polarity. The sub-pixels SP37_4 and SP37_5 are alternately connected to the vertical lines VL37 and VL38 disposed at both sides of the sub-pixels SP37_4 and SP37_5, and thus the sub-pixels SP37_4 and SP37_5 receive the first signals with different polarities.

As a result, the sub-pixels SP37_4 to SP42_5 are inversely driven every sub-pixel, e.g., in a dot inversion driving scheme.

The number of the sub-pixels, which are inversely driven, is determined depending on shapes, arrangements, and driving schemes of the sub-pixels and arrangements of the diagonal lines DL2_2 to DL2_4 and the crossing lines CL2 to CL_(n−1), and it should not be limited to a specific number of the sub-pixels.

Figure 5A:
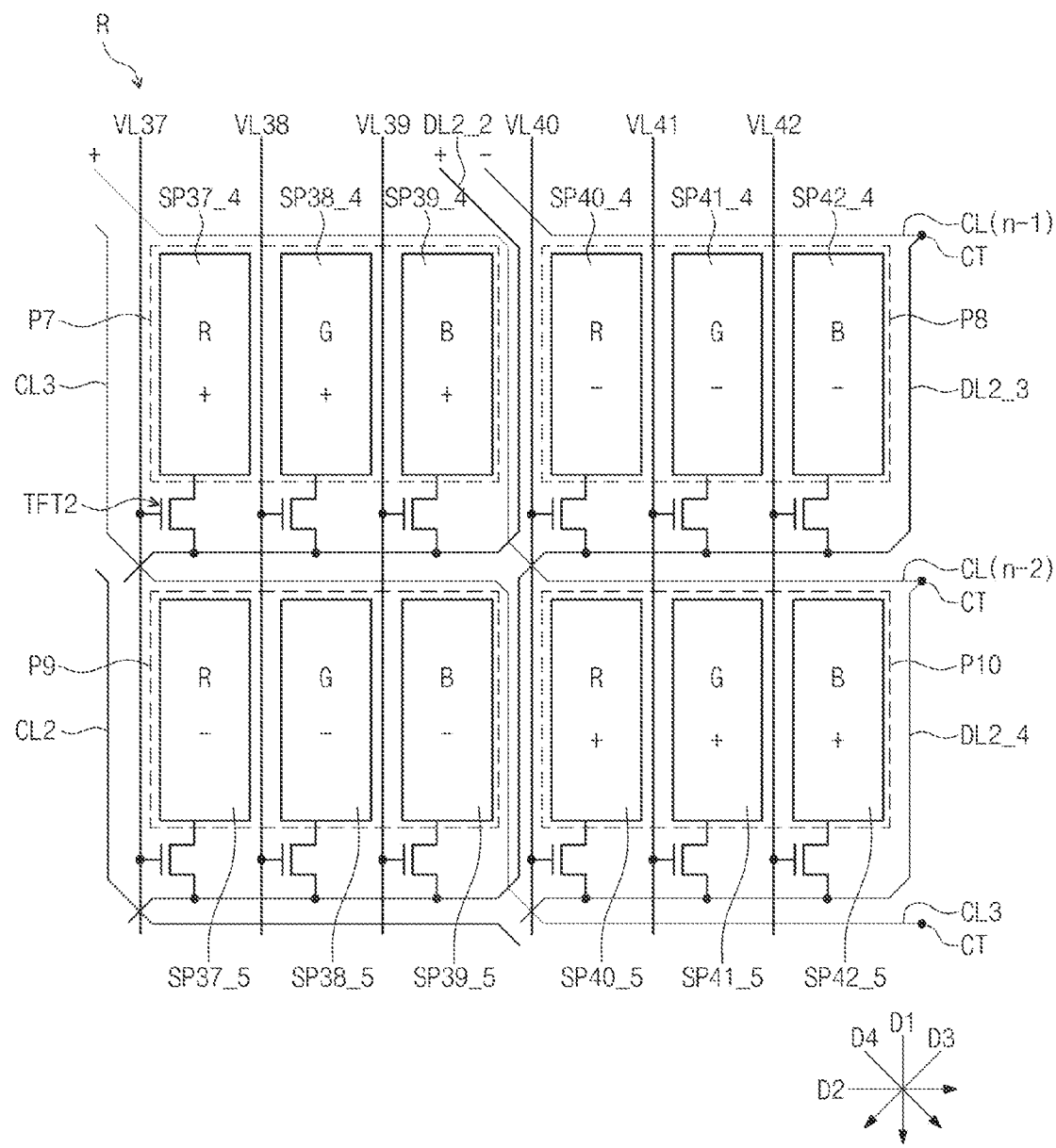
FIGS. 5A and 5B are enlarged views regarding a portion "R" of FIG. 3 according to another exemplary embodiment of the present disclosure.
Figure 5B:
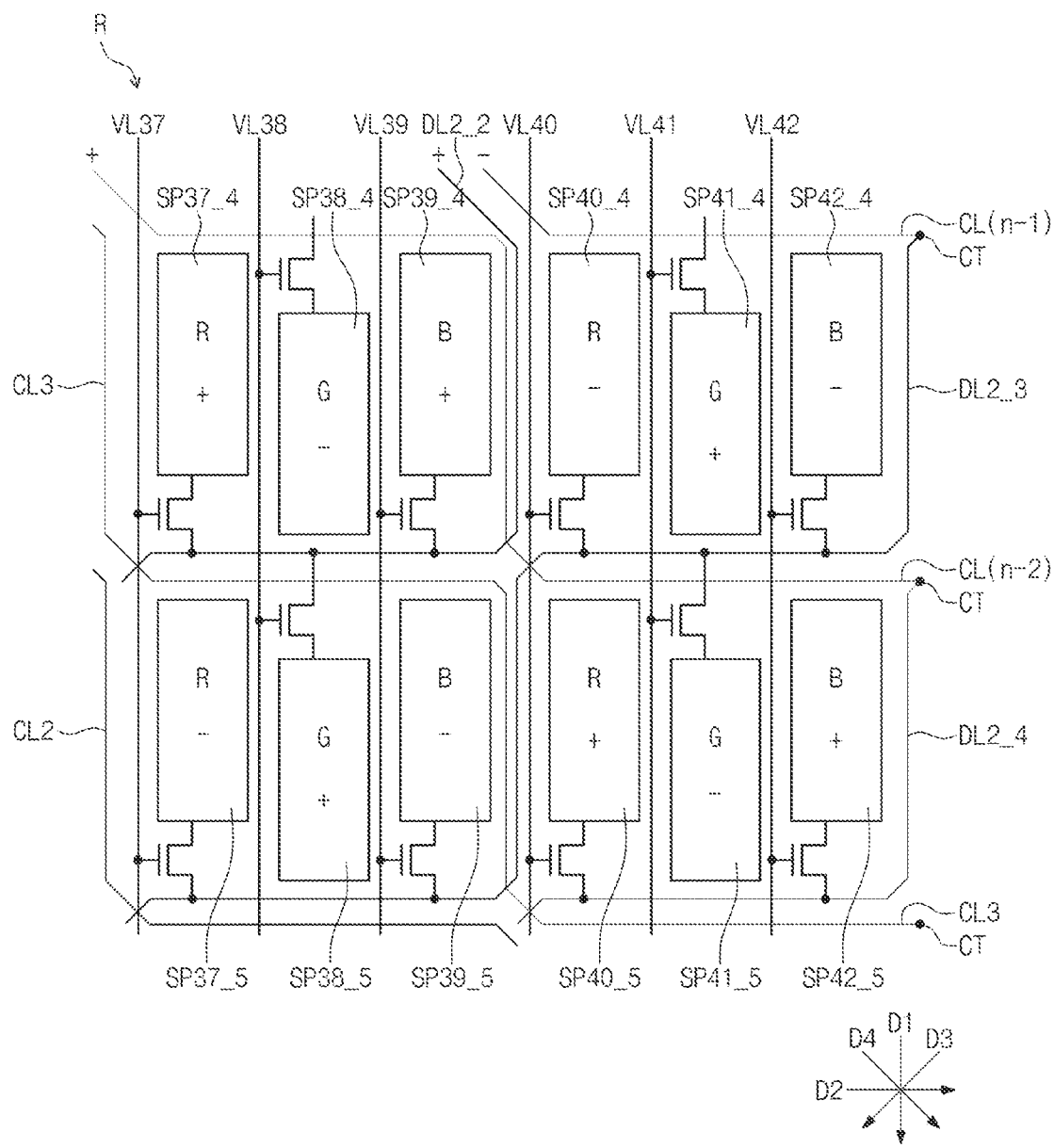

FIGS. 5A and 5B are enlarged views regarding a portion "R" of FIG. 3 according to another exemplary embodiment of the present disclosure. In the present exemplary embodiment, the first and second drivers 10 and 20 may be, but not limited to, the gate and data drivers, respectively, and thus the first and second signals may be, but not limited to, the gate and data signals, respectively. Hereinafter, different features of the display panel shown in FIGS. 5A and 5B from those of the display panel shown in FIGS. 4A and 4B will be mainly described.

Referring to FIGS. 5A and 5B, each of the sub-pixels SP37_4 to SP42_5 is connected to the corresponding vertical line and the corresponding diagonal line. In particular, each of the sub-pixels SP37_4 to SP42_5 is connected to the corresponding vertical line and the corresponding diagonal line through the corresponding thin film transistor. A gate electrode of a thin film transistor TFT2 is connected to the corresponding vertical line VL37, a source electrode of the thin film transistor TFT2 is connected to the corresponding diagonal line DL2_2, and a drain electrode of the thin film transistor TFT2 is connected to the corresponding sub-pixel SP37_4. Accordingly, the thin film transistor TFT2 receives the data signal in response to the gate signal and applies the data signal to the sub-pixel SP37_4 connected thereto.

Each of the vertical lines VL37 to VL42 is disposed adjacent to one side of the sub-pixel columns arranged in the first direction D1. The sub-pixels arranged in the same column are connected to one vertical line disposed adjacent to the one side thereof.

Each of the sub-pixels SP37_4 to SP42_5 receives the first signal as the gate signal through the corresponding vertical line of the vertical lines VL37 to VL42, which is connected thereto. Therefore, the sub-pixels SP37_4 to SP42_5 are sequentially operated in the unit of the sub-pixels connected to the same vertical line.

In addition, each of the sub-pixels SP37_4 to SP42_5 receives the second signal as the data signal through the corresponding diagonal line of the diagonal lines DL2_2 to DL2_4. In this case, the second signals applied to adjacent diagonal lines among the diagonal lines DL2_2 to DL2_4 have different polarities from each other. For instance, the second signals applied to the diagonal lines DL2_2 and DL2_4 adjacent to each other have the positive and negative polarities, respectively.

The sub-pixels SP37_4 to SP42_5 are grouped every predetermined number of sub-pixels to define a plurality of pixel groups. In more detail, the sub-pixels SP37_4 to SP42_5 are grouped as viewed relative to the polarity of the second signals applied to the sub-pixels SP37_4 to SP42_5 to define the pixel groups. Thus, the sub-pixels grouped into the same pixel group receive the second signals having the same polarity. On the contrary, the sub-pixels included in the pixel groups adjacent to each other receive the second signals having different polarities. The adjacent pixel groups indicate the pixel groups adjacent to each other in the first and second directions D1 and D2.

For instance, among the pixel groups, at least one third sub-pixel included in a third pixel group such as P7 or P10 receives the second signal having the positive polarity and at least one fourth sub-pixel included in a fourth pixel group such as P8 or P9 adjacent to the third pixel group receives the second signal having the negative polarity. As a result, the sub-pixels SP37_4 to SP42_5 are inversely driven in the unit of the pixel group.

Referring to FIG. 5A, the sub-pixels SP37_4 to SP42_5 are grouped into the pixel groups P7 to P10 in the unit of three sub-pixels arranged in the second direction D2. In this case, the three sub-pixels included in one pixel group, i.e., the same pixel group, are connected to the same diagonal line and receive the second signals having the same polarity. In addition, the sub-pixels included in the adjacent pixel groups are connected to different diagonal lines from each other and receive the second signals having different polarities from each other.

For instance, the third sub-pixels SP37_4 to SP39_4 included in the third pixel group P7 receive the second signals having the positive polarity, and the fourth sub-pixels SP40_4, SP41_4, and SP42_4 included in the fourth pixel group P8 disposed at a right side of the third pixel group P7 receive the second signals having the negative polarity.

As a result, the sub-pixels SP37_4 to SP42_5 are inversely driven every three sub-pixels arranged in the second direction D2.

Referring to FIG. 5B, each of the sub-pixels SP37_4 to SP42_5 may be defined as one pixel group. In this case, the sub-pixels SP37_4 to SP42_5 (or the pixel groups) adjacent to each other are connected to different diagonal lines DL2_2 to DL2_4, respectively, and thus the sub-pixels adjacent to each other receive the second signals having different polarities.

For instance, the third sub-pixel SP37_4 receives the second signal with the positive polarity and the fourth sub-pixel SP38_4 disposed at a right portion of the third sub-pixel SP37_4 receives the second signal with the negative polarity. The sub-pixels SP37_4 and SP42_4 arranged in the second direction D2 are alternately connected to the diagonal lines disposed at both sides of the sub-pixels SP37_4 and SP42_4, and thus the sub-pixels SP37_4 and SP42_4 receive the second signals with different polarities.

As a result, the sub-pixels SP37_4 to SP42_5 are inversely driven every sub-pixel, e.g. in a dot inversion driving scheme.

In the present exemplary embodiment, the number of the sub-pixels, which are inversely driven, is determined depending on shapes, arrangements, and driving schemes of the sub-pixels and arrangements of the diagonal lines DL2_2 to DL2_4 and the crossing lines CL2 to CL_(n−1), and it should not be limited to a specific number of the sub-pixels.

Figure 6A:
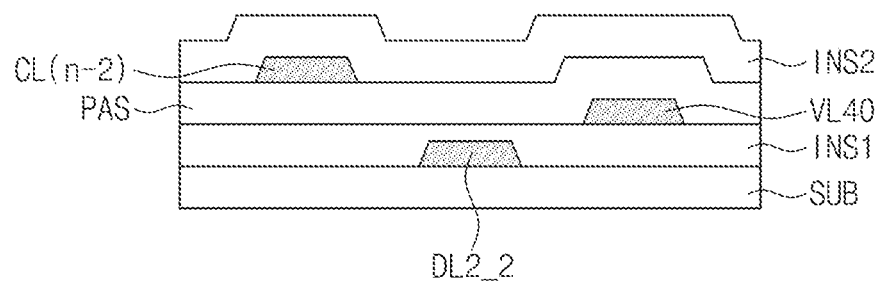
FIGS. 6A, 6B, and 6C are cross-sectional views regarding areas "A", "B", and "C" respectively of FIG. 4A.
Figure 6B:
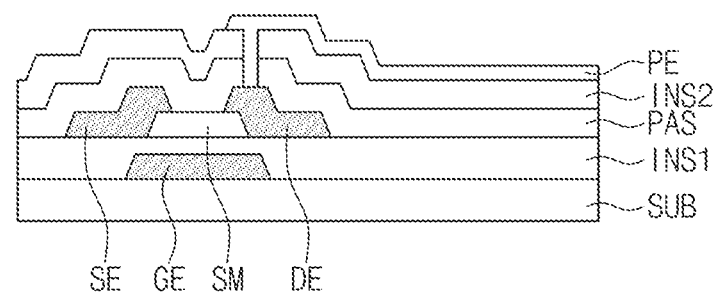
Figure 6C:
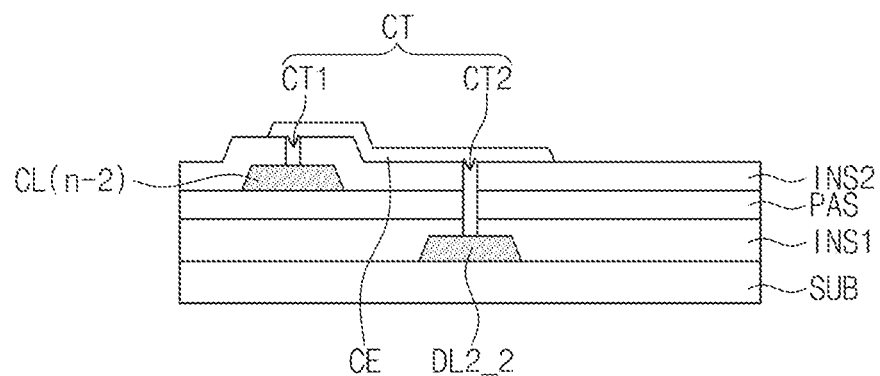
Figure 7A:
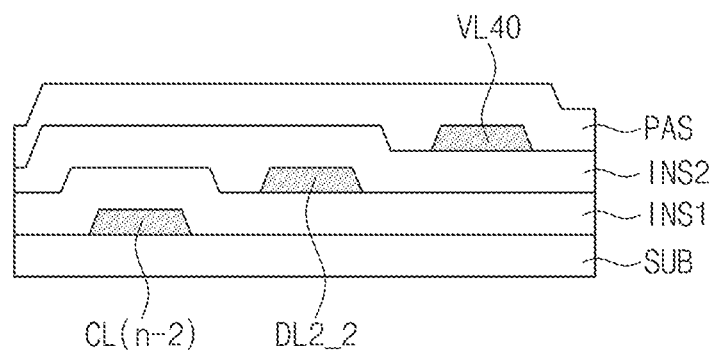
FIGS. 7A, 7B and 7C are cross-sectional views regarding areas "A", "B" and "C" respectively of FIG. 4A.
Figure 7B:
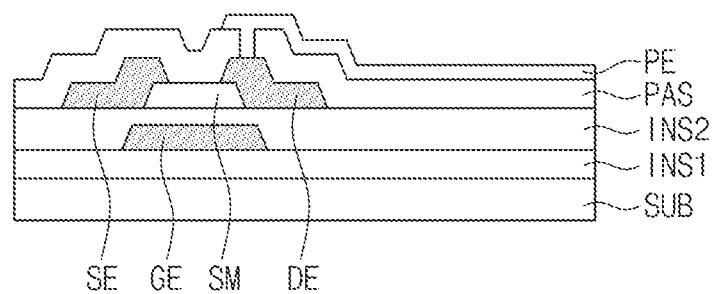
Figure 7C:
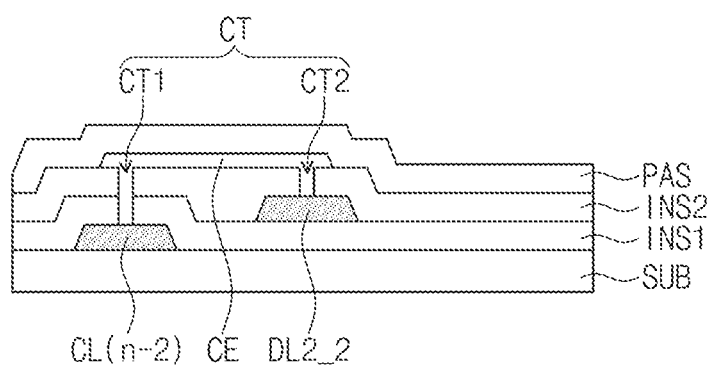

FIGS. 6A to 6C and 7A to 7C are cross-sectional views showing areas "A", "B", and "C" of FIG. 4A. In detail, FIGS. 6A and 7A show the cross-sectional view of the area A, FIGS. 6B and 7B show the cross-sectional view of the area B, and FIGS. 6C and 7C show the cross-sectional view of the area C.

Referring to FIGS. 6A to 6C and 7A to 7C, the vertical lines VL37 to VL42, the diagonal lines DL2_2 to DL2_4, and the crossing lines CL2 to CL_(n-1) are disposed on different layers to be electrically insulated from each other. In addition, the order of stacking of the vertical lines VL37 to VL42, the diagonal lines DL2_2 to DL2_4, and the crossing lines CL2 to CL_(n-1) is determined by the deposition order of the vertical lines VL37 to VL42, the diagonal lines DL2_2 to DL2_4, and the crossing lines CL2 to CL_(n-1). FIGS. 6A to 6C show the cross-sectional view of the display panel 100 in which the crossing lines CL_(n-2) are deposited after the thin film transistor is formed, and FIGS. 7A to 7C show the cross-sectional view of the display panel 100 in which the crossing lines CL_(n-2) are deposited before the thin film transistor is formed.

Referring to FIG. 6A, the diagonal line DL2_2 is disposed on a substrate SUB and a first insulator INS1 is disposed on the substrate SUB and the diagonal line DL2_2 to cover the diagonal line DL2_2. The vertical line VL40 is disposed on the first insulator INS1 and a passivation PAS is disposed on the first insulator INS1 and the vertical line VL40 to cover the vertical line VL40. The crossing line CL_(n-2) is disposed on the passivation PAS and a second insulator INS2 is disposed on the passivation PAS and the crossing line CL_(n-2) to cover the crossing line CL_(n-2). The vertical line VL40, the diagonal line DL2_2, and the crossing line CL_(n-2) are disposed not to overlap with each other when viewed from a plan view. The first and second insulators INS1 and INS2 and the passivation PAS are formed of an insulating material to insulate the vertical line VL40, the diagonal line DL2_2, and the crossing line CL_(n-2) from each other.

Referring to FIG. 6B, the gate electrode GE is disposed on the same layer as the diagonal line DL2_2. The gate electrode GE receives the gate signal. A semiconductor thin film layer SM, the source electrode SE, and the drain electrode DE are disposed on the same layer as the vertical line VL40. The source electrode SE and the drain electrode DE are spaced apart from each other such that the semiconductor thin film layer SM is disposed between the source electrode SE and the drain electrode DE and portions of the source and drain electrodes SE and DE are connected to the semiconductor thin film layer SM. The drain electrode DE is connected to a pixel electrode PE through a contact hole formed through the passivation PAS and the second insulator INS2. The semiconductor thin film layer SM may be, but not limited to, an amorphous silicon thin film layer or an oxide semiconductor (IGZO) thin film layer. Referring to FIG. 6C, the crossing line CL_(n-2) and the diagonal line DL2_2 are connected to each other through a contact portion CT. The contact portion CT includes a first contact hole CT1 and a second contact hole CT2.

In more detail, the first contact hole CT1 is formed through the second insulator INS2 disposed on the crossing line CL_(n-2) and the second contact hole CT2 is formed through the first and second insulators INS1 and INS2 and the passivation PAS, which are disposed on the diagonal line DL2_2. A contact electrode CE is formed on the second insulator INS2 to connect the crossing line CL_(n-2) and the diagonal line DL2_2 through the first and second contact holes CT1 and CT2. As a result, the crossing line CL_(n-2) and the diagonal line DL2_2 are electrically connected to each other by the contact electrode CE.

In the present exemplary embodiment, the diagonal line DL2_2 may be the second diagonal line in which the one end thereof is disposed at the second side 40. Accordingly, the one end of the second diagonal line DL2_2 and the other end of the crossing line CL_(n-2) are connected to each other through the contact portion CT.

Referring to FIG. 7A, the crossing line CL_(n-2) is disposed on the substrate SUB and the first insulator INS1 is disposed on the substrate SUB and the crossing line CL_(n-2) to cover the crossing line CL_(n-2). The diagonal line DL2_2 is disposed on the first insulator INS1 and the second insulator INS2 is disposed on the first insulator INS1 and the diagonal line DL2_2 to cover the diagonal line DL2_2. The vertical line VL40 is disposed on the second insulator INS2 and the passivation PAS is disposed on the second insulator INS2 and the vertical line VL40 to cover the vertical line VL40. The first and second insulators INS1 and INS2 and passivation PAS are formed of an insulating material to insulate the vertical line VL40, the diagonal line DL2_2, and the crossing line CL_(n-2) from each other.

Referring to FIG. 7B, the gate electrode GE is disposed on the same layer as the diagonal line DL2_2. The gate electrode GE receives the gate signal. The semiconductor thin film layer SM, the source electrode SE, and the drain electrode DE are disposed on the same layer as the vertical line VL40. The drain electrode DE is connected to a sub-pixel electrode PE through a contact hole formed through the passivation PAS disposed thereon. The source electrode SE, the drain electrode DE, and the semiconductor thin film layer SM are substantially the same as those described with reference to FIG. 6B.

Referring to FIG. 7C, a first contact hole CT1 is formed through the first and second insulators INS1 and INS2 disposed on the crossing line CL_(n-2) and a second contact hole CT2 is formed through the second insulator INS2 disposed on the diagonal line DL2_2. The contact electrode CE is disposed on the second insulator INS2 and connected to the crossing line CL_(n-2) and the diagonal line DL2_2 through the first and second contact holes CT1 and CT2. As a result, the crossing line CL_(n-2) and the diagonal line DL2_2 are electrically connected to each other by the contact electrode CE.

In the present exemplary embodiment, the diagonal line DL2_2 may be the second diagonal line in which the one end thereof is disposed at the second side 40. Accordingly, the one end of the second diagonal line DL2_2 and the other end of the crossing line CL_(n-2) are connected to each other through the contact electrode CE.

In FIGS. 6A to 6C and 7A to 7C, the first and second drivers 10 and 20 are described as the data and gate drivers, respectively. However, the structures described with reference to FIGS. 6A to 6C and 7A to 7C may be applied to the display panel 100 in which the first and second drivers 10 and 20 serve as the gate and data drivers, respectively. Therefore, although the first and second drivers 10 and 20 respectively serve as the gate and data drivers, the vertical line, the diagonal line, and the crossing line may be disposed on the different layers to be electrically insulated from each other and the diagonal line and the crossing line may be connected to each other through the contact portion, thereby applying the gate signals to the sub-pixels.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device, comprising:
a display panel comprising a plurality of sub-pixels;
a first driver disposed at a first side of the display panel and generating first signals; and
a second driver disposed adjacent to the first side and generating second signals,
wherein the display panel comprises:
vertical lines comprising one ends disposed at the first side and applying the first signals from the first driver to the sub-pixels;
diagonal lines crossing the vertical lines and applying the second signals to the sub-pixels; and
crossing lines crossing the vertical lines and the diagonal lines,
wherein the diagonal lines comprise:
first diagonal lines of which one ends are disposed at the first side; and
second diagonal lines in which one ends are disposed at a second side of the display panel adjacent to the first side,
wherein the crossing lines have one ends disposed at the first side and the other ends disposed at the second side, and receive the second signals from the second driver and apply the second signals to the second diagonal lines, and
wherein the vertical lines, the diagonal lines, and the crossing lines intersect when viewing from top but are insulated from each other.

2. The display device of claim 1, wherein:
the vertical lines extend in a first direction and are arranged in a second direction,
the diagonal lines extend in a third direction,
the crossing lines extend in a fourth direction, and
the first direction, the second direction, the third direction, and the fourth direction are different from each other.

3. The display device of claim 2, wherein the first direction is substantially vertical to the first side and the second direction is substantially parallel to the first side.

4. The display device of claim 2, wherein the sub-pixels are arranged in the first direction and the second direction on the display panel.

5. The display device of claim 4, wherein
the sub-pixels are grouped into a plurality of sub-pixel columns by the sub-pixels arranged in the first direction, and
the sub-pixel columns are alternately arranged with the vertical lines on the display panel.

6. The display device of claim 5, wherein the diagonal lines and the crossing lines have a step-like shape.

7. The display device of claim 6, wherein the diagonal lines and the crossing lines are bent every predetermined number of the sub-pixels to have the step-like shape.

8. The display device of claim 7, wherein each of the sub-pixels is connected to a corresponding vertical line of the vertical lines and a corresponding diagonal line of the diagonal lines.

9. The display device of claim 1, wherein the vertical lines, the diagonal lines, and the crossing lines are disposed on different layers from each other and insulated from each other.

10. The display device of claim 9, wherein the display panel further comprises contact portions to connect the second diagonal lines to the crossing lines.

11. The display device of claim 1, wherein the sub-pixels are grouped into a plurality of pixel groups and each of the pixel groups is configured to include the sub-pixels receiving signals having a same polarity.

12. The display device of claim 11, wherein the sub-pixels are inversely driven by each of the pixel groups.

13. The display device of claim 12, wherein
the first signals are data signals,
the first driver is a data driver,
the second signals are gate signals, and
the second driver is a gate driver.

14. The display device of claim 13, wherein the sub-pixels included in the pixel groups adjacent to each other among the pixel groups receive the first signals having different polarities.

15. The display device of claim 14, wherein
each sub-pixels in a first pixel group receive the first signals with a positive polarity, and
each sub-pixels in a second pixel group next to the first pixel group receive the first signals with a negative polarity.

16. The display device of claim 13, wherein the sub-pixels are sequentially operated by each of the sub-pixels connected to a same diagonal line in response to the second signals.

17. The display device of claim 12, wherein
the first signals are gate signals,
the first driver is a gate driver,
the second signals are data signals, and
the second driver is a data driver.

18. The display device of claim 17, wherein the sub-pixels are sequentially operated by each of the sub-pixels connected to a same vertical line in response to the first signals.

* * * * *